United States Patent [19]

Levine

[11] 4,335,847
[45] Jun. 22, 1982

[54] ELECTRONIC THERMOSTAT WITH REPETITIVE OPERATION CYCLE

[76] Inventor: Michael R. Levine, 2900 Heatherway, Ann Arbor, Mich. 48104

[21] Appl. No.: 153,343

[22] Filed: May 27, 1980

[51] Int. Cl.³ .................... F23N 5/20; G06F 15/20
[52] U.S. Cl. ............................ 236/46 R; 165/12; 364/505; 340/309.1
[58] Field of Search .............. 236/46 R, 47; 165/12; 364/410, 505; 340/309.1

[56] References Cited

U.S. PATENT DOCUMENTS

| | | | |
|---|---|---|---|
| 3,050,257 | 8/1962 | Sweger et al. | 236/74 |
| 3,183,705 | 5/1965 | Welkowitz | 73/1 |
| 3,220,648 | 11/1965 | Partsch | 236/9 |
| 3,324,725 | 6/1967 | Yerman | 73/362 |
| 3,702,076 | 11/1972 | Georgi | 73/362 AR |
| 3,817,105 | 6/1974 | Luhowy | 73/362 AR |
| 3,877,307 | 4/1975 | Georgi | 73/362 AR |
| 3,912,913 | 10/1975 | Bunting | 136/46 R |
| 3,922,535 | 11/1975 | Randolph | 236/46 R X |
| 3,939,459 | 2/1976 | Hoopes | 340/347 NT |
| 3,942,718 | 3/1976 | Palmieri | 236/78 R |
| 3,964,676 | 6/1976 | Rooks et al. | 236/46 R |
| 3,964,677 | 6/1976 | Schalow et al. | 236/46 R |
| 3,972,237 | 8/1976 | Turner | 73/362 AR |
| 3,978,471 | 8/1976 | Kelly | 340/347 NT |
| 3,979,059 | 9/1976 | Davis et al. | 236/46 R |
| 3,988,577 | 10/1976 | Leitner et al. | 235/151.1 |
| 3,996,451 | 12/1976 | Harrington et al. | 235/92 MT |
| 4,001,557 | 1/1977 | Stephenson | 235/151.1 |
| 4,071,745 | 1/1978 | Hall | 165/22 X |
| 4,079,366 | 3/1978 | Wong | 340/309.1 |
| 4,177,923 | 12/1979 | Krump | 236/46 R |

OTHER PUBLICATIONS

Master Plumber, 5/1969.
The Enertrol Multiplex Energy Controller Exhibits D-M.
NASA Tech. Briefs, Spring 1980, Energy-Saving Thermostat.
"Enertrol Multiplex Energy Controller", American Stabilis, Sales Literature.
"ITT General Controls T199", Lee, E. K., Master Plumber and Heating Contractor, May 1969.
Jensen, NASA Tech. Briefs, Spring 1980, p. 33, A Thermostat Programmable to Allow Temperature to Rise Gradually by Activation of a Heat Pump Prior to Later Activation of Resistance Heating System.

*Primary Examiner*—William E. Wayner
*Attorney, Agent, or Firm*—Krass, Young & Schivley

[57] ABSTRACT

An electronic multiple-setback thermostat for residential and commercial use includes an internal clock having a week-long cycle. The thermostat is programmed by the operator, usually manually actuable input devices, to control the furnace/air conditioning system to achieve a schedule of temperatures over the weekly period by simply inputting the temperature desired to be attained at the time of entry. Each temperature entry may be programmed to reoccur on a daily basis or to modify the program on a once-a-week basis. The thermostat employs an internal clock which controls memory addresses so that each memory location is representative of a short time period during the weekly cycle. A desired temperature signal is entered in a memory location determined by the clock state at the time of entry and is read out to the control system each time that time state reoccurs. The external temperature sensor employs a thermistor controlled oscillator that is used as the system clock source during failures of the primary power source.

20 Claims, 3 Drawing Figures

ELECTRONIC THERMOSTAT WITH REPETITIVE OPERATION CYCLE

TECHNICAL FIELD

This invention relates to programmable thermostats for controlling a heating and/or cooling system to maintain predetermined temperatures at times over a repetitive time cycle and more particularly to such a system in which the operator programs the thermostat by inputting a desired temperature and the system achieves that temperature at the programming time on a repetitive basis.

BACKGROUND ART

Most residential thermostats include means for entering a single set point and operate to control their associated heating and/or air conditioning system (hereinafter "furnace") to maintain the set point temperature. Substantial energy savings can be achieved if the set point is lowered during periods when the house is unoccupied or the occupants are sleeping and a form of "set back" thermostat employs a mechanical clock which allows the entry of two set points to be achieved at different periods on a repetitive time cycle.

My co-pending application, Ser. No. 778,376, now U.S. Pat. No. 4,206,872 entitled "Electronic Thermostat" discloses a system including a digital memory capable of storing a lengthy schedule of desired temperatures for times within a repetitive cycle. The memory is continually interrogated by a digital clock to output a signal representative of the desired temperature set point at the time and this temperature is compared to the measured building temperature to control the operation of the furance. This system allows the provision of relatively complicated time/temperature programs to accommodate to the habits of the building's occupants.

My U.S. Pat. No. 4,172,555 discloses an improved form of multiple set-point electronic thermostat in which the system adaptively determines the rate of temperature change that occurs within the building during operation of the heating/cooling system and energizes the furnace a period of time before a programmed temperature in order to insure that the programmed temperature is attained within the building at the proper time.

These systems represent highly economical energy conserving alternatives to conventional residential thermostats but programming the systems is relatively complicated and may be confusing to a user. Also, an appreciable percentage of the manufacturing cost of these systems is dedicated to programming devices and displays that are required to simplify the programming.

The present invention is directed toward an electronic multiple set-point thermostat employing a low cost form of program entry which is easy to understand and use.

DISCLOSURE OF THE INVENTION

In contrast to previous programmable multiple set-point thermostats for which it was necessary for the operator to program each set-point change by entering the time of the change and the desired temperature at that time, the present invention provides a thermostat which is programmed by merely entering a desired temperature at the time that the temperature is desired to be attained. The operator can also control whether the temperature change is to be programmed for daily reoccurrence or only for weekly reoccurrence. The thermostat is thus programmed on a real time basis by the operator inputting desired temperatures at appropriate times. During the first day of operation a daily program is entered and over the balance of the week alternative programs that are to be operative once a week are entered. By way of example, the occupants may arise at 7:00 a.m. six days a week and want to sleep until 9:00 a.m. on Sunday. The desired temperature at rising is entered during the first day of operation at 7:00 a.m. On Sunday morning the operator can reprogram the device so that the normal daily program will be changed each Sunday.

This simplified programming is achieved by providing an internal clock which acts as a memory address and sequentially points to different memory sections. The desired set-point is read into memory at the section designated by the clock at the time of the set-point entry and that desired set-point is read out of memory and used to control the thermostat each time the clock cycle returns to that memory section.

The present invention further contemplates an improvement in the adaptive thermostat disclosed in my U.S. Pat. No. 4,172,555. Rather than programming a particular night set-back temperature that is attained until a time determined on an adaptive basis when the furnace is turned on so that the morning wake-up temperature can be achieved at the proper time, the system simply turns off the furnace at the programmed evening time and restarts the furnace at a time adaptively determined to be sufficient to achieve the programmed temperature at wake-up time. No control is exercised over the minimum temperature achieved during the night other than by a safety switch which prevents the building temperature from going below a predetermined minimum, such as 45° F.

The program entry controls of the thermostats of the present invention simply comprise means for entering a desired temperature, either absolutely, or relative to some reference temperature; means for clearing the program; and means for switching between automatic control and a constant temperature. The elementary nature of the controls lowers the cost of the thermostat relative to prior art electronic thermostats and simplifies the programming operation to avoid confusion to the operator.

Another aspect of the present invention resides in the use of a temperature sensitive, variable frequency oscillator to generate an electrical signal representative of the ambient temperature and also to act as a clock source for a microcomputer implementing the thermostat eliminating the need for a separate clock oscillator. The system is normally powered from the alternating current power mains and a battery is provided for back-up during power failure. Upon power failure the frequency of the temperature sensitive oscillator is measured and the oscillator is then used as a time standard during the power failure to maintain the internal clock with a reasonable degree of precision.

BEST MODE FOR CARRYING OUT THE INVENTION

Figure 1:
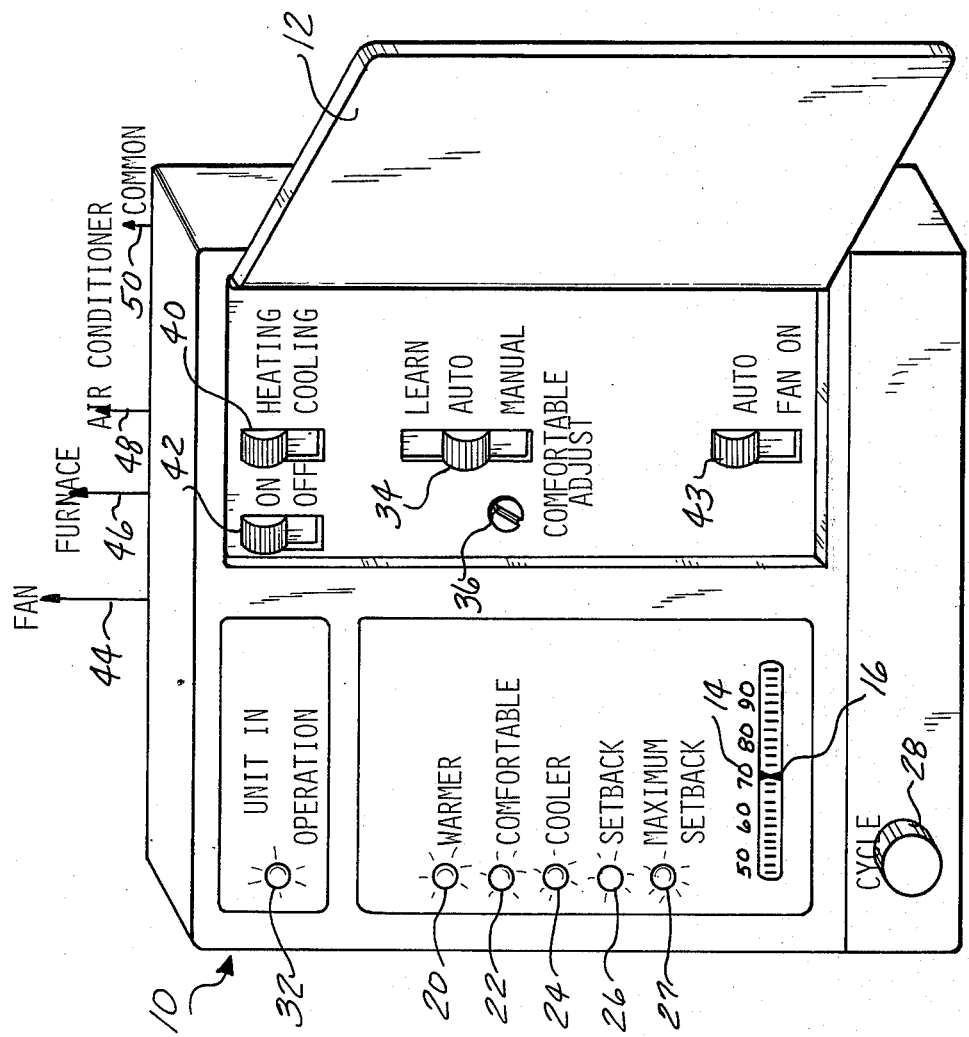
FIG. 1 is a perspective view of an operating panel of a preferred embodiment of my thermostat.
Figure 2:
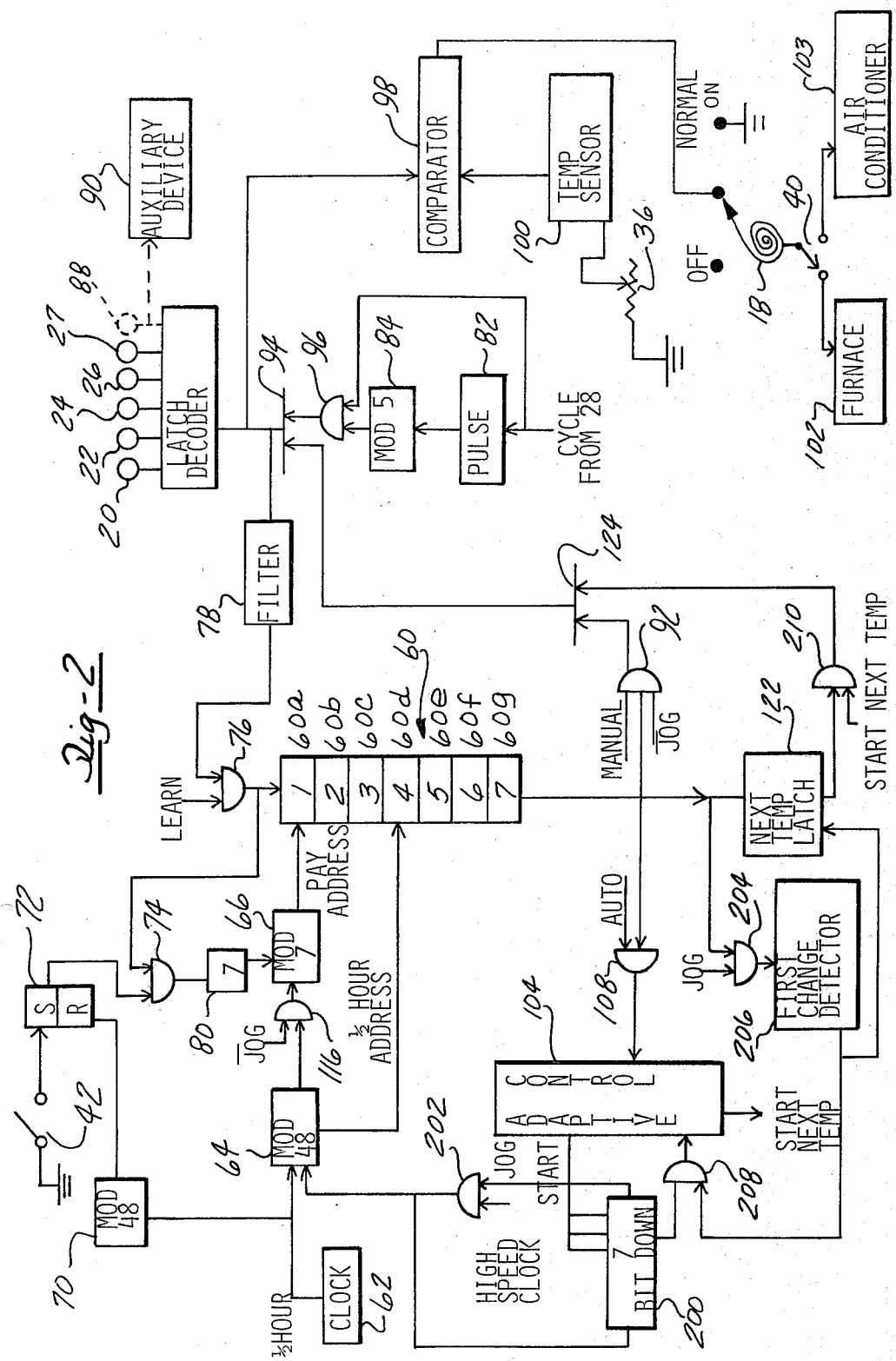
FIG. 2 is a schematic diagram illustrating the functional operation of a preferred microprocessor based embodiment of my thermostat, or, alternatively, a schematic diagram of an embodiment of the thermostat based on discrete subsystems.
Figure 3:
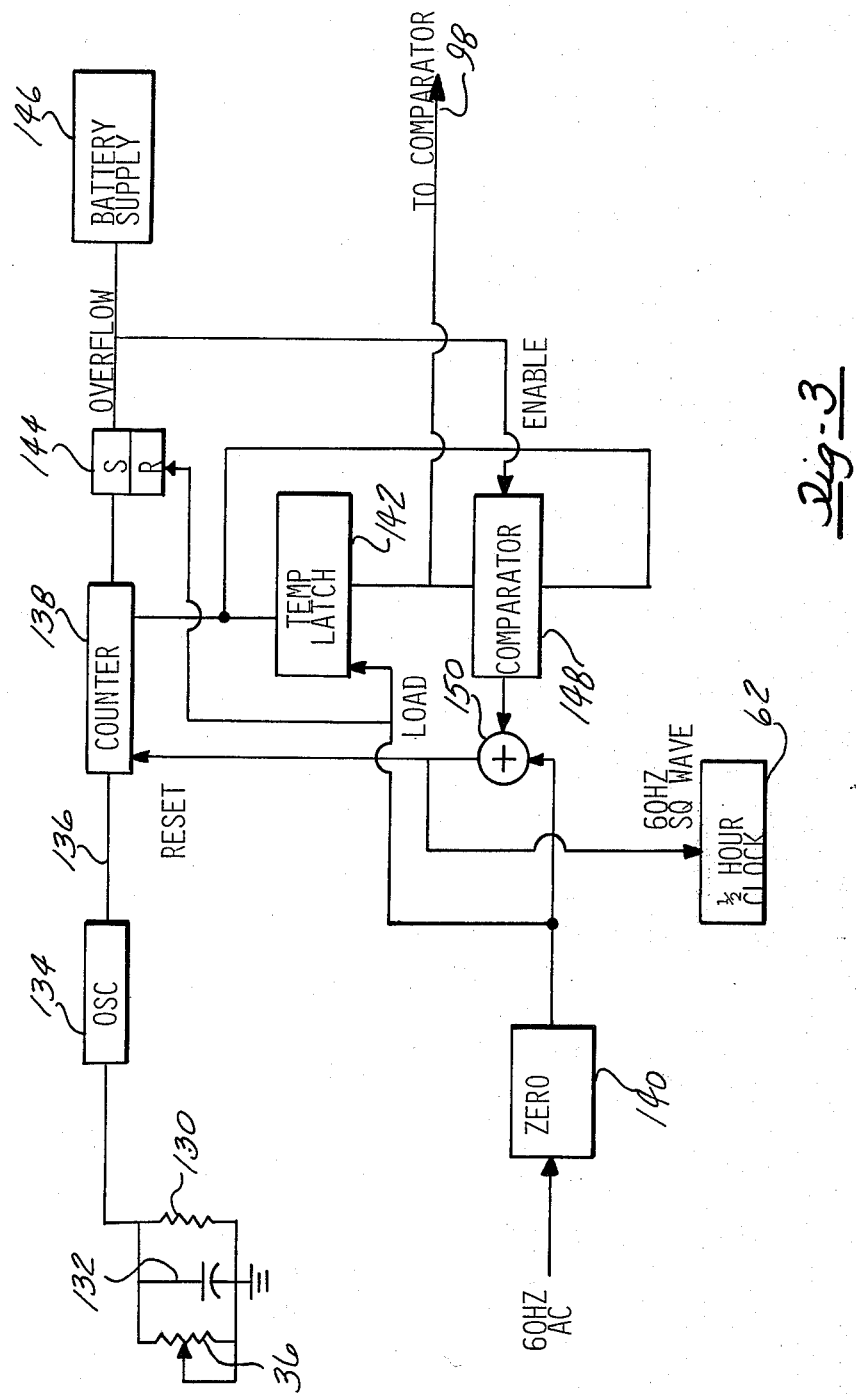
FIG. 3 is a similar schematic diagram of certain sections of my thermostat.

A preferred embodiment of the invention is illustrated in FIGS. 1–3. The thermostat is packaged in a housing 10 illustrated in FIG. 1. The controls and displays for the thermostat are arrayed on the front panel of the case 10. A pivotable door 12 supported on a vertical hinge extending along one side of the front panel is normally closed and hides a set of input controls positioned on the right side of the front panel as it is viewed in FIG. 1 that are used less frequently than the controls positioned on the left side of the panel. The door 12 is shown in FIG. 1 in its open position in which the less frequently used controls are visible.

The visible controls and displays include an analog scale 14 associated with a pointer 16 that displays the atmospheric temperature at the thermostat. The pointer 16 may be positioned by a conventional measurement device such as a spiral bi-metal coil 18, illustrated in FIG. 2. Numerical indicia are associated with the scale 14 so that the actual temperature at the thermostat may be read as a function of the position of the pointer 16.

Normally accessible controls include a series of four lights such as light emitting diodes (LED'S) 20, 22, 24, 26 and 27. The legends "WARM"; "COMFORTABLE"; "COOLER"; "SET BACK" and "MAXIMUM SET BACK" are associated with the five lights 20–27, respectively. An operator controlled push button 28, having the legend "CYCLE" imprinted in association, may be depressed by the operator to cause the LED'S 20–27 to cycle sequentially into their energized states at a rate of approximately one cycle per second. If the push button 28 is lifted while one of the LED'S is energized, the cycle will stop and that LED will remain energized. In this manner, the operator can select one of five cycles. As an alternative to the light and the CYCLE button a five-position switch could be employed.

The readily accessible controls further include a light emitting diode 32 with the associated legend "UNIT IN OPERATION".

Those controls which are normally hidden by the door 12 and are arrayed across the lower half of the front panel of the case 10 include a three-position switch 34 with the legends "LEARN"; "AUTO"; and "MANUAL" associated with its positions; a screwdriver adjustable shaft 36 with the legend "COMFORTABLE ADJUST" associated therewith; a two-position switch 40 with the legends "HEATING" and "COOLING" associated with its positions; a two-position "ON-OFF" switch 42; and a two-position "AUTO"-"FAN ON" switch 43.

The thermostat is connected to the associated ventilation equipment via four wires 44, 46, 48 and 50 which are intended to connect to the ventillation fan, furnace, air conditioner and common terminal of the power line, respectively. Other embodiments of the invention could be used with two lines to simply control operation of the furnace.

The manner in which the thermostat functions under control of the operator will now be explained without reference to the internal arrangement of the thermostat in the belief that this will render the subsequent description of the internal arrangement of the thermostat more readily understandable.

Assume that initial use of the device is in the winter, when furnace operation is desired. After wires 44–50 are properly connected, the switch 42 is first turned on to the ON position and switch 40 is turned to the HEATING position. Switch 34 is turned to the MANUAL position. Switch 43 is turned to the desired fan control mode. In the AUTO mode the fan is energized whenever the furnace or air conditioner is energized by the thermostat.

Next the push button 28 is depressed until the CYCLE light 22 associated with COMFORTABLE is energized.

Assuming that the room temperature is relatively low, i.e., below about 62° F., the furnace will be energized via line 44 and the light 32 will turn on. The temperature within the room associated with the thermostat will begin to increase until a predetermined temperature is attained, at which point the light 32 will go off. This is the COMFORTABLE or normal temperature then associated with the thermostat. It may be in a range from about 65° F. to 80° F. If the operator desires a different normal temperature the shaft 36 may be rotated to modify COMFORTABLE. By watching the light 32 and temperature indicator 16 the operator can determine the normal temperature and modify it using adjustment 36.

This COMFORTABLE temperature will be the usual daytime temperature when the building is occupied. In order to program the thermostat with a particular daily SET BACK cycle, the operator then waits until some change in the temperature is desired. For example, if the thermostat is installed in the afternoon the operator may wait until normal bedtime in the house when a substantially lower, night SET BACK operation is desired. Assuming the SET BACK is desired at 11:00 p.m., at that time the operator switches the switch 34 to the "LEARN" position and depresses the CYCLE button 28 until the either the SET BACK light 26 or the MAXIMUM SET BACK light 27 is energized. This action programs the thermostat to go into a SET BACK mode each night at 11:00 p.m.

In the MAXIMUM SETBACK mode the system will turn off the furnace at the SETBACK time and leave it off until it must be turned on in order to warm the building to attain the programmed wake-up temperature in the morning. In the SETBACK mode the minimum temperature will be approximately 10° below COMFORTABLE until the furnace must begin warming the building to attain the programmed wake-up temperature at its scheduled time. In either mode the system will determine the necessary start-up time adaptively by measuring the rate of temperature change within the building while the furnace is energized and calculating the necessary turn-on time in order to attain the next scheduled temperature. This adaptive mode cannot be employed until a wake-up temperature has been programmed so during the first night after it is programmed the minimum temperature will be 5° below COMFORTABLE.

Next assume that it is desired that the building be warmed up to slightly lower than COMFORTABLE temperature by 6:30 a.m. At 6:30 a.m. the operator presses the cycle button until the COOLER light 24 is energized. Thereafter a temperature approximately 2° less than COMFORTABLE will be programmed at 6:30 a.m. each morning until the program is altered. If SETBACK or MAXIMUM SETBACK. Is the previous program entry and switch 38 is in the MAXIMUM setting, the thermostat will operate in the adaptive mode previously described.

Next assume that the operator desires that a temperature SETBACK occur at 9:00 a.m. At 9:00 a.m. the CYCLE button 28 is depressed until the SETBACK light 26 is energized. A typical daily cycle might further include attaining a temperature about 2° above COMFORTABLE at 6:00 p.m. This is achieved by energizing the light 20 at 6:00 p.m. through use of the CYCLE button 28.

Twenty-four hours after the first program entry was made in the LEARN mode the system automatically switches to a learning mode wherein program changes only alter the particular day of the week in which the change is made; i.e., a change made at Saturday noon will be operative each Saturday thereafter until the programming is altered. For example, assume that the daily schedule involves going to SET BACK temperature at 11:00 p.m. and on Friday night the occupants go to sleep at 12 midnight and accordingly want to alter the daily schedule for the weekend. At 10:00 p.m. or so on Friday night the occupant would depress the CYCLE button 28 until the presently desired temperature was attained, such as NORMAL.

If the set point thus programmed is the same as the existing set point, no alteration will be made in the computer's program, but the action will initiate a mode in which existing memory entries will be erased as they are called up from memory and new entries which operate on a weekly basis only will be entered. These changes will not affect the other six days of the week. Thus when the normal 11:00 p.m. SET BACK program is called out it will be erased from the memory for that day of the week and will have no further effect on the operation of the thermostat.

At 12:00 p.m. the operator would then operate the CYCLE button until the system was in SET BACK while still in LEARN mode. This would permanently enter 12 midnight as the SET BACK time for that day in the week only. The 6:30 a.m. wake-up time would be automatically erased for that day of the week. Assuming the occupants sleep until 9:00 a.m. on Saturday, they would program a desired morning temperature, such as COOLER at 9:00 a.m. while the system was still in the LEARN mode and that would be entered for that day.

After all desired alternative daily schedules have been entered the operator returns switch 34 to the AUTOMATIC position.

The system can be set into the MANUAL mode, enabling the setting provided in the CYCLE switch, at any time, without in any way altering the memory. When the system is returned to the AUTO mode the programmed temperature cycle is resumed.

The normal adjust 36 may be modified at any time to increase or decrease the COMFORTABLE temperature and the COOLER and WARMER temperatures.

The electronic components of the thermostat are preferably implemented using a micro-computer, properly programmed to achieve the described functions. FIG. 2 is a schematic diagram which may be interpreted in terms of a discrete sub-system version of the thermostat and its connected components, or alternatively as a functional guide to the structure of a program for a micro-processor.

Referring to FIG. 2, the thermostat includes a digital random access memory generally indicated at 60 partitioned into seven sections denominated 60a, 60b, 60c, 60d, 60e, 60f and 60g. These may constitute separate sections of a single memory or separate memory modules. Each memory section stores the temperature program for one 24-hour period in the seven day, repetitive cycle of the thermostat.

A clock 62, powered in a manner which will subsequently be described, generates a digital signal, each one-half hour. These signals are provided to a modulus 48 counter 64 which generates a signal for the memory 60 representative of the one-half hour period within the day. Each time the mod 48 counter 64 overflows it provides a signal to a mod 7 counter 66 which generates one of seven output signals which acts as an address for one of the seven memory sections 60a–60g. The half hour clock 62 also feeds a mod 48 counter 70 which controls the condition of a flip-flop 72. The flip-flop is placed in an initial SET condition when the switch 42 first turns the system on and starts the clock. After 24 hours an overflow signal from the mod 48 counter 70 places the flip-flop 72 in a RESET condition. While in the SET condition the flip-flop 72 causes any changes in the cycle lights 20–27 to be recorded in the current half-hour memory locations within all seven of the memory sections 60a–60g. When the flip-flop 72 is reset after 24 hours, mode changes are only recored in the single memory section addressed by the output of the mod 7 counter 66.

This operation is achieved by circuitry including an AND gate 74 conditioned by the set output of flip-flop 72 and by the output of an AND gate 76. The AND gate 76 is in turn conditioned by the LEARN output of switch 34 and a signal from a filter 78 which emits signals representative of changes in the cycle lights 20–27 which last for more than three seconds. This insures that the rapid cycling of the lights 20–27 which occurs when the operator presses the cycle button 28 will only modify the memory as a function of the last cycle position achieved.

Accordingly, when the mode is changed by virtue of depression of the CYCLE button 28 and the system is in LEARN, the gate 76 provides an output to the memory 60 and also to the AND gate 74. If the flip-flop 72 is in the SET condition, as it is durng the first 24 hours of the LEARN cycle, a signal will be provided to a seven pulse generator 80. The pulses outputted by the generator 80 are provided to the mod 7 counter 66 to cause the day address of the memory to be cycled through seven states. The output from the AND gate 76 is sustained during this cycling and accordingly that output is recorded in the memory position pointed to by the one-half hour address output of the mod 48 counter 64 in each of the seven memory sections 60a–60g as they are sequentially addressed in rapid order by the output of the mod 7 counter 66 under the influence of the generator 80.

Alternatively, if the flip-flop 72 is in the RESET condition, as it is after the first 24 hours of the LEARN cycle, the seven pulse generator 80 is not energized and the output of the gate 76 is only recorded in the appropriate one-half hour time slot of the single memory section being pointed to by the output of the mod 7 counter 66. If the system is not in the LEARN mode but is in either the AUTO or MANUAL mode, the outputs of the filter 78 representing changes in the CYCLE mode are not recorded in memory.

When the CYCLE button 28 is depressed, a pulse generator 82 is energized and pulses at a one cycle per second rate are provided to a mod 5 counter 84. The counter provides signals to a one out of five latching decoder 86 that energizes one of the LED'S 20-27. A fifth light 88 is illustrated in phantom and represents an alternative arrangement wherein the system could exercise control over some auxilliary device, other than the furnace/air conditioning unit. For example, the system could be used to turn on lights or an appliance within the house at a desired time through provision of an auxilliary control device such as 90 which could be controlled by the system.

When the system is in the AUTO mode the CYCLE lights 20-27 are energized as a function of the outputs from the memory through an AND gate 92. The gate 92 receives outputs from the memory which are determined by the composite address signal generated by the mod 7 counter 66 and the mod 48 counter 64. The gate 92 is also conditioned by a MANUAL signal from switch 34 and a $\overline{\text{JOG}}$ signal, the source of which will be subsequently described. The output of the gate 92 is provided to the decoder 86 through an OR gate 94, where it is summed with the output of an AND gate 96, to control the condition of the lights 20-27.

The AND gate 96 receives the output of the mod 5 counter 84 and is conditioned by a signal from the push button 28 indicating that it is depressed. Thus the decoder 86 and the lights 20, 22, 24, 26 and 27 are conditioned by the output of the memory when the system is in the AUTO mode, and the cycle button is not being depressed, and by the output of the counter 84, controlled by the CYCLE button 28, when the system is in either the LEARN or the MANUAL mode.

The output of the OR gate 94 is provided to a comparator 98. The comparator also receives the output of a temperature sensor 100 and provides a two-state output signal adapted to control the state of energization of the furnace/air conditioner, to bring the sensed temperature into accord with the temperature called for by the thermostat.

The temperature sensor 100 provides an output that is trimmed by the COMFORTABLE adjust potentiometer 36. Its output is thus in effect a composite signal which is a function of both the sensed temperature and the position of the COMFORTABLE adjust potentiometer.

The output of the comparator 98 is provided to the furnace 102 and/or air conditioner 102 through the heat/cool switch 40 and the bi-metal switch 18. The bi-metal switch 18 has three positions. It is usually in the NORMAL position in which the output of the comparator 98 controls the furnace 102. The switch 18 goes to an OFF position when the temperature in the environment of the thermostat exceeds a maximum temperature such as 95° F. and goes to an ON position when the temperature in the environment of the thermostat goes below a minimum temperature; i.e., 45° F. This relationship is reversed when the system is in the cooling mode and the controlled device is an air conditioner.

An adaptive control subsystem 104 is energized when the system is in AUTO and the output of memory constitutes the SETBACK mode. This condition is sensed by an AND gate 108. The adaptive control 104 also receives the output of the temperature sensor 100 and the comparator 98.

When the system enters the adaptive mode the control 104 provides a start signal to a 7 bit binary down counter 200. The start signal loads binary ONES into the three most significant positions of this 7 bit counter, effectively presetting it with a count of 48. The presence of a ONE in the most significant position of a counter 7 constitutes a signal termed JOG which is provided to one conditioning input of an AND gate 202. The other input to the AND gate 202 is from a high speed clock that is continually operative. The output of the AND gate 202 is provided to the input of the 7 bit down counter 200 and begins to count it down at the output rate of the high speed clock. The pulses from the AND gate 202 are also provided to the MOD 48 counter 64. After 48 pulses have been provided to the counter 200, as well as to the counter 64, the contents of the counter 200 will constitute zeros in all 7 positions and the MOD 48 counter 64 will have returned to the value that existed before the beginning of the JOG cycle. The existence of all zeros in the counter 200 causes termination of the JOG signal.

The JOG signal also conditions an AND gate 204 which receives its other conditioning input from the output of the memory 60 and provides an output to a first change detector 206. The detector examines the output of the memory during the JOG cycle and upon the occurrence of the first change, representing the next temperature programmed in the memory, provides an output signal to a next temperature latch 122 which also receives the output from the memory 60 and stores the next output value. The output signal from the first change detector 206 also conditions an AND gate 208 that acts to load the contents of the down counter 200, at the instant that the first temperature change is detected, into the adaptive control 104. This signal is a function of the time interval between the present time and the time when the next program temperature is scheduled to occur.

The output of the next temperature latch is provided to an AND gate 210 which is also conditioned by an output from the adaptive control 104 termed START NEXT TEMP. This signal occurs at the time calculated by the adaptive control signal for starting of the furnace in order to attain the next scheduled temperature at its programmed time. The signal from the AND gate 210 is provided to the OR gate 124 and through the OR gate to the latched decoder 86.

The adaptive control monitors the furnace ON signal when the system is not in SETBACK to determine and continually up-date the duty cycle of the furnace. The duty cycle is a function of the rate of heat exchange between the building being heated and the exterior environment at any time and is thus also proportional to the rate of temperature increase in the building while the furnace is on.

The adaptive control 104 then calculates the time at which the furnace must be turned on to attain the next programmed temperature at its programmed time based on the equation Time=$\Delta T/(T_{ex} \cdot K)$ where $T_{ex}$ equals the duty cycle and $\Delta T$ equals future program temperature minus present temperature.

The constant K, in units of degrees/hour, is determined adaptively by a comparison of the time at which the furnace actually reaches the next scheduled temperature and the time at which it is programmed to reach that next scheduled temperature. Each time the system ends the adaptive mode K is increased by one increment, preferably one degree per hour, when the programmed temperature is attained before its scheduled time and is decreased by one increment when the programmed temperature is not yet attained at the scheduled time.

Accordingly, after the JOG cycle the temperature contained in the next temperature latch 122 is provided to the comparator 98 through the OR gates 124 and 94. However, the adaptive control 104 generates an OFF signal which is provided to the comparator 98 and prevents furnace actuation until the adaptive control removes the OFF signal at a time before the next program temperature calculated to allow the furnace to attain the next programmed temperature within the building at its scheduled time. The detailed manner of operation of the adaptive control 104 is disclosed in my U.S. Pat. No. 4,172,555.

The memory is thus programmed by placing the switch 42 in the ON position and placing the switch 34 in the LEARN position. Thereafter, the mode called for by the LED'S 20-27 is programmed into the memory. During the first 24 hours of operation the programming is recorded into all of the seven day sections of the memory. After the first 24 hours of operation changes made in the operating mode while the switch 34 is still in a LEARN position are only recorded in the memory section for that day. After the operator is satisfied with the recorded cycle the switch 34 may be turned to the AUTO position. At any time the switch may be turned to the MANUAL position and the recorded control program will be ignored and the mode called for by the condition of the LED'S 20-27 will be followed.

The switch 34 can be returned to the LEARN position to modify any single day temperature record at the option of the operator.

When the switch 42 is turned to the OFF position the program is cleared providing a clean slate for reprogramming.

The detailed construction of the temperature sensor 100 and the circuitry feeding the clock 62 are illustrated in FIG. 3. The temperature is preferably sensed by a thermistor 130 although other temperature sensitive elements such as a temperature sensitive diode could be used for the function. The thermistor 130 is shunted by a capacitor 132, as well as by the comfortable adjust potentiometer 36. These three units form the RC circuit for an oscillator 134, operative to generate an output signal having a frequency which is a function of both the temperature sensed by the thermistor 130 and the setting of the potentiometer 36.

The oscillator 134 preferably forms the internal oscillator of a microprocessor and the output signals from the oscillator, on line 136, generate the microprocessor internal clock signals, so that the clock cycle of the microprocessor is controlled by the output of the oscillator 134. The variations in the rate of operation of the microprocessor which result from this design do not deleteriously affect the performance of this thermostat and the arrangement eliminates the need for separate oscillators for generating a temperature variable signal and for serving as the internal clock of the microprocessor.

The temperature sensitive output of the oscillator on line 136 is provided to a counter 138 which, like the other digital units of the thermostat, is preferably implemented by registers within the microprocessor.

The 60 cycle power supply is applied to a zero crossing detector 140 which generates a 60 Hz square wave. This signal resets counter 138 resets the overflow flip-flop 144 and causes the contents of counter 138 to be transfered to the temperature latch 142. The frequency of the oscillator will be substantially higher than 60 cycles per second, preferably in the kilohertz range, so that the number of pulses generated on line 136 during 1/60th of a second will be relatively large and will vary significantly as a function of variations in the ambient temperature on the thermistor 130. The contents of the temperature latch 142 will be modified to conform with the count read-out of the counter 138 each 1/60th of a second. The contents of the temperature latch 142 constitute the output of the temperature sensor 100 which is provided to the comparator 98 illustrated in FIG. 2.

In the event of failure of the 60 cycle power supply no output signals will be provided by the zero crossing detector 140 and the counter 138 will quickly overflow. The overflow signal sets a flip-flop 144 which is reset by the output of the zero crossing detector when the 60 cycle power supply resumes. The set output of the flip-flop 144 switches on a battery power supply 146 that powers the oscillator 134 as well as the other circuitry of the microprocessor. The set output of the flip-flop 144 also energizes a comparator 148 which receives the parallel output of the temperature latch 142 and the parallel output of the counter 138. When the count within the counter reaches the number stored in the temperature latch the comparator provides a reset output to the counter via OR gate 150, returning it to zero. These reset outputs thus occur at a 1/60th of a second rate as long as the output of the oscillator 134 remains constant. During the period of less than a few minutes characteristic of a typical power outage, the ambient temperature on the thermistor 130 should not vary so greatly as to make a significant change in the frequency of the oscillator 134.

While power is provided by the 60 cycle mains the outputs of the zero crossing detector 140 are provided to the clock 62, illustrated in FIGS. 2 and 3, through the gate 150. When the 60 cycle power fails and the outputs from the zero crossing detector 140 terminate, the resetting outputs from the comparator 148 are fed to the clock 62 through the OR gate 150, acting as a substitute for the usual clock pulses.

This arrangement preserves the internal clock of the thermostat in substantial synchronism with real time despite power failures of up to a few hours or even days, depending upon the rate of heat transferred between the building and the exterior during that period. This eliminates the need to reprogram the thermostat following power outages of a moderate duration. Although the internal clock may drift by a few seconds or even a few minutes during one of these power outages, because of the variation in the output frequency of the oscillator 134 as a result of temperature changes during the outage, these will not substantially affect the performance of the thermostat since it is usually not critical whether a temperature is attained at a particular time with a high degree of precision.

Having thus described my invention, I claim:

1. A system for controlling the operative state of a device over a repetitive time period comprising:
   a clock operative to generate digital signals representative of the time within the repetitive time period;
   a digital memory;
   input means for loading digital signals of desired states of the device into the memory;
   means for recording the time of entry of each state signal within the repetitive time period; and
   means, controlled by the clock for generating state control signals for the device over the repetitive time period, the state control signals being generated at times which are a function of their time of entry into the memory.

2. The system of claim 1 wherein said means for recording the time of entry of each state signal within the repetitive time period comprises means for entering the state of the clock at the time of entry of a desired state signal into the memory along with the state signal.

3. The system of claim 1 wherein the memory is arranged in a plurality of sections, each representative of a particular time period during the repetitive time cycle and said means for recording the time of entry of each state signal within the repetitive time period comprises means for loading a desired state signal into the memory section associated with the time of entry of that signal.

4. The system of claim 3 including means controlled by the clock for sequentially interrogating the memory sections so that a control signal stored in the memory is generated from the memory section at the same time in the repetitive time period that it was entered into the memory.

5. The system of claim 1 in which said input means for loading signals into the memory comprises manually adjustable means for indicating a desired state and a switch positionable in a first position wherein modifications in the desired state are entered into the memory or in a second position wherein modifications of the desired state are not entered into the memory.

6. The system of claim 5 wherein said system is capable of controlling any one of a plurality of devices and including manually operable means for generating a signal representative of the device with which said desired state is associated and for storing said last signal in association with the state signal.

7. The controller 20 of claim 1 wherein the clock output comprises signals representative of time periods within the repetitive time cycle and subperiods within each repetitive time period and including means for recording set point signals in the memory in a first manner in which a recorded set point signal will effect a change in control signal output once during each clock cycle or in a second manner in which each recorded set point will effect a change in the control signal once each period of the clock cycle.

8. An electronic thermostat comprising: an electronic clock operative to generate signals representative of a repetitive, time cycle;
   a memory adapted to store a temperature program for the cycle;
   operator actuated control means for entering desired temperature state signals into the memory;
   means for storing signals from the clock representative of the time of entry of a desired temperature state with each desired temperature state entered into the memory;
   means controlled by the output of the clock for interrogating the memory to derive signals representative of the desired temperature state at a particular time;
   means for generating an electricl signal representative of the actual temperature in the environment of the thermostat; and
   comparator means for receiving signals representative of the actual temperature and the desired temperature and for generating output control signals.

9. The electronic thermostat of claim 8 wherein said means for storing signals from the clock representative of the time of entry of the desired temperature with each desired temperature state entered into the memory comprises means for associating each of a plurality of sections of the memory with a different state of the clock and means for entering desired temperature state into the memory section associated with the state of the clock at the time of entry of the desired temperature state.

10. The thermostat of claim 8 wherein the memory is divided into seven daily sections and each section is divided into a plurality of subsections.

11. The thermostat of claim 9 further including means for entering a desired temperature state signal either into one section of the memory so that it affects the control mode on a weekly basis, or into each section of the memory so that it affects the control mode on a daily basis.

12. The thermostat of claim 11 wherein said means for entering a desired temperature state signal either into one section of the memory so that it affects the control mode on a weekly basis, or into each section of the memory so that it affects the control mode on a daily basis, is controlled by the clock so that during an initial period of operation of the thermostat a desired temperature state signal is entered into each station of the memory so that it affects the control mode on a daily basis and thereafter a desired temperature state signal is entered into only one section of the memory so that it only affects a control mode on a weekly basis.

13. In a thermostat having a clock operative to generate electrical signals representative of the time in a repetitive cycle, a memory adapted to retain a program of desired temperatures at particular times in the repetitive cycle;
   manually operable control means for entering desired temperatures into the memory; and
   circuitry for interrogating the memory with the output of the clock to generate signals representative of the desired temperature at a particular time, the improvement comprising:
   means for storing the output of the clock at the time a particular desired temperature is entered into the memory in association with the memory signals representative of the desired temperature, whereby the operator need only program the desired temperature at a particular time to allow the system to control generation of that temperature at that particular time each time it reoccurs in the repetitive time cycle.

14. The thermostat of claim 13 wherein said means for storing the output of the clock at the time a particular desired temperature is entered into the memory comprises means for arranging the memory in a plurality of sections, each representative of a particular time period during the repetitive time cycle and means for loading a desired temperature signal into the memory section associated with the time of entry of that signal.

15. The thermostat of claim 14 including means for entering a desired temperature signal either into one section of the memory so that it affects the control mode on a weekly basis, or into each section of the memory so that it affects the control mode on a daily basis.

16. In a process controller, in combination:
   a clock operative to generate signals representative of the time within a repetitive time cycle;
   operator control means for generating a signal representative of a set point for the process;
   a memory operative to record the signal representative of the set point in a manner dependent upon the status of the clock at the time of generation of the set point signal; and means controlled by the clock for generating output control signals for the process based on the recorded set points and the time of recordation of the set points.

17. The controller of claim 16 wherein said memory constitutes a plurality of separate memory sections each representative of a separate time segment within the repetitive time cycle and the manner of recording the set point in association with the time of change of the set point comprises recording a changed set point in a memory section associated with the time of change of the set point.

18. The controller of claim 17 in which said means for generating control signals as a function of the time within the repetitive time cycle in which said set point changes were recorded consists of means employing the output of the clock as a memory address to output control signals from the memory sections in which they were recorded as a function of the status of the clock.

19. The controller of claim 16 including manually operable control means for modifying the set point signal.

20. The controller of claim 16 including switch means positioned in a first position wherein the control signals generated are based upon set points recorded in the memory and a second position wherein the control signals outputted are a function of the condition of the means for generating signals representative of set points.

* * * * *

UNITED STATES PATENT AND TRADEMARK OFFICE
CERTIFICATE OF CORRECTION

PATENT NO. : 4,335,847
DATED : June 22, 1982
INVENTOR(S) : Michael R. Levine

It is certified that error appears in the above-identified patent and that said Letters Patent are hereby corrected as shown below:

In the Abstract, line 4, please delete "usually" and insert --using--.

Column 1, line 35, please delete "furance" and insert --furnace--.

Column 5, line 1, please delete "Is" and insert --is--.

Column 6, line 26, please delete "recored" and insert --recorded--; line 44, please delete "durng" and insert --during--.

Column 9, line 64, after "138" please insert --,--.

Column 11, line 46, after "repetitive" please delete ","; line 59, please delete "electricl" and insert --electrical--.

Signed and Sealed this

Thirty-first Day of August 1982

[SEAL]

Attest:

Attesting Officer

GERALD J. MOSSINGHOFF
Commissioner of Patents and Trademarks